United States Patent
Ferchau et al.

(10) Patent No.: US 12,306,834 B1
(45) Date of Patent: May 20, 2025

(54) ARTIFICIAL INTELLIGENCE PLATFORM AND METHOD FOR AI-ENABLED SEARCH AND DYNAMIC KNOWLEDGE BASE MANAGEMENT

(71) Applicant: ARTI ANALYTICS, INC., Morgan Hill, CA (US)

(72) Inventors: Joerg Ferchau, Morgan Hill, CA (US); Tarik Hubana, Sarajevo (BA); Migdat Hodzic, San Jose, CA (US)

(73) Assignee: ARTI ANALYTICS, INC., Morgan Hill, CA (US)

( * ) Notice: Subject to any disclaimer, the term of this patent is extended or adjusted under 35 U.S.C. 154(b) by 0 days.

(21) Appl. No.: 18/941,826

(22) Filed: Nov. 8, 2024

Related U.S. Application Data

(60) Provisional application No. 63/684,775, filed on Aug. 19, 2024.

(51) Int. Cl.
  *G06F 16/24* (2019.01)
  *G06F 16/22* (2019.01)
  *G06F 16/2453* (2019.01)

(52) U.S. Cl.
  CPC .... *G06F 16/24542* (2019.01); *G06F 16/2237* (2019.01)

(58) Field of Classification Search
  None
  See application file for complete search history.

(56) References Cited

U.S. PATENT DOCUMENTS

| | | | |
|---|---|---|---|
| 5,586,218 A | 12/1996 | Allen | |
| 6,094,649 A | 7/2000 | Bowen et al. | |
| 7,069,254 B2 | 6/2006 | Foulger et al. | |
| 7,716,148 B2 | 5/2010 | Meng et al. | |
| 9,058,362 B2 | 6/2015 | Vijayaraghavan et al. | |

(Continued)

FOREIGN PATENT DOCUMENTS

| | | | |
|---|---|---|---|
| KR | 2016-0047232 A | * | 5/2016 |
| KR | 10-2726490 B1 | * | 11/2024 |
| TW | 200903267 A | | 1/2009 |

OTHER PUBLICATIONS

Clustered Retrieved Augmented Generation, Kesson et al (Year: 2024).*

(Continued)

*Primary Examiner* — Augustine K. Obisesan
(74) *Attorney, Agent, or Firm* — Stephen E. Zweig

(57) ABSTRACT

An intelligent search agent that can accept search request input in various ways to initiate a search of databases, websites, documents, PDF files, photos, and other digital data. Search requests can be initiated manually, through automated scheduling, and other ways and can be initiated in multiple ways including voice input, text input, form filling, large language model (LLM) processes, AI agents, selecting from dashboard menus, computer instructions and other methods. Applications of machine learning (ML) and natural language processing (NLP) and others are used to enhance the search agent's capabilities while minimizing user effort requirements. The Search Agent works in conjunction with a knowledge base function to dynamically form and manage one or more knowledge bases using search results and to automatically integrate search results into workflow processes.

20 Claims, 10 Drawing Sheets

(56) References Cited

U.S. PATENT DOCUMENTS

| | | | |
|---|---|---|---|
| 9,858,343 | B2 | 1/2018 | Heck et al. |
| 11,645,479 | B1 | 5/2023 | Coursey |
| 11,948,560 | B1 | 4/2024 | Coursey |
| 2010/0030734 | A1 | 2/2010 | Chunilal |
| 2019/0034767 | A1* | 1/2019 | Sainani ............... G06F 16/2465 |
| 2024/0289365 | A1* | 8/2024 | Beauchamp ........ G06F 16/3329 |
| 2024/0386041 | A1* | 11/2024 | Erickson ............. G06F 16/3329 |

OTHER PUBLICATIONS

M-RAG: Reinforcing Large Language Model Performance through Retrieval-Augmented Generation with Multiple Partitions, Wang et al (Year: 2024).*

Retrieval-Augmented Generation with One-Time Vector Database Built from Search Results, (Year: 2023).*

Surla et al, An Easy Introduction to Multimodal Retrieval-Augmented Generation, Mar. 20, 2024, Nvidia; downloaded from https://developer.nvidia.com/blog/an-easy-introduction-to-multimodal-retrieval-augmented-generation/ on Oct. 20, 2024.

Zhu et al., REALM: RAG-Driven Enhancement of Multimodal Electronic Health Records Analysis via Large Language Models (2024) arXiv:2402.07016v1 [cs.AI] Feb. 10, 2024; downloaded from https://arxiv.org/abs/2402.07016 on Oct. 20, 2024.

Chen et al., "MuRAG: Multimodal Retrieval-Augmented Generator for Open Question Answering over Images and Text", arXiv:2210.02928v2 [cs.CL], downloaded from https://arxiv.org/abs/2210.02928 on Oct. 20, 2022.

* cited by examiner

FIG. 7

| Funding Opportunity Name | Opportunity number | Agency | Total Funding Amount (USD) | Maximum Award Size (USD) | Deadline | Validated |
|---|---|---|---|---|---|---|
| GFO-23-307 - Large-Scale Centralized Clean Hydrogen Production (H2CENTRAL) | GFO-23-307 | Energy Government California Grants | N/A | N/A | N/A | ● Yes |
| GFO-23-608 - Military Electric Vehicle Chargers | GFO-23-608 | Energy Government California Grants | 7,000,000 | 3,500,000 | 2025-12-31T23:59:00 | ● Yes |
| Air Quality Investment Program | N/A | Air Quality South Coast | N/A | N/A | N/A | ○ No |
| Applied Materials | N/A | ARPA-E | 4,958,074 | N/A | N/A | ○ No |
| Antora Energy | N/A | ARPA-E | 7,969,968 | 7,969,968 | N/A | ● Yes |
| Ampaire | N/A | ARPA-E | 2,490,001 | 2,490,001 | N/A | ● Yes |
| American Superconductor (AMSC) | N/A | ARPA-E | 4,262,756 | N/A | N/A | ● Yes |
| American Manufacturing | N/A | ARPA-E | 850,000 | N/A | N/A | ○ No |
| Arcadia Biosciences | N/A | ARPA-E | 1,416,351 | 1,416,351 | N/A | ● Yes |
| Alcoa | N/A | ARPA-E | 4,267,218 | 4,267,218 | N/A | ● Yes |

FIG. 8

| Name of Sources | Source URL | Status | Actions |
|---|---|---|---|
| U.S. Department of transportation | https://www.transportation.gov/grants/dashboard | Activated | Delete |
| U.S. Department of Energy | https://eere-exchange.energy.gov | Activated | Delete |
| Energy Government California Grants | https://www.energy.ca.gov/funding-opportunities/solicitations | Activated | Delete |
| Funding wizard | https://fundingwizard.arb.ca.gov/reft/search/all | Activated | Delete |
| Federal government grants | https://www.grants.gov/search-grants | Activated | Delete |
| Governor's office Planning and Research | https://opr.ca.gov | Activated | Delete |
| California Fire | https://www.fire.ca.gov/ | Activated | Delete |
| California Recycle | https://calrecycle.ca.gov/funding/ | Activated | Delete |
| New York State ERDA | https://www.nyserda.ny.gov/Funding-Opportunities/Current-Funding-Opportunities | Activated | |

ARTIFICIAL INTELLIGENCE PLATFORM AND METHOD FOR AI-ENABLED SEARCH AND DYNAMIC KNOWLEDGE BASE MANAGEMENT

CROSS-REFERENCE TO RELATED APPLICATIONS

This application claims the priority benefit of U.S. provisional patent application No. 63/684,775, filed Aug. 19, 2024; the entire contents of which are incorporated herein by reference.

BACKGROUND OF THE INVENTION

Field of the Invention

The present invention relates to an artificial intelligence system and method. The invention provides a system and method for acquiring information from various digital sources using search agents with specialized capabilities, producing customized information outputs, and producing an optimized knowledge base thereby providing more refined, curated, and directly useful information.

Description of the Related Art

The advent of the internet and the proliferation of online data sources revolutionized the way information is accessed and consumed. Traditional search engines, search tools, and data mining applications have been at the forefront of this revolution, allowing users to retrieve information by entering queries into a search interface which typically returns a list of hyperlinks (URLs) to web pages or lists of files, or brief abstracts that may contain the relevant information. While these traditional search tools have greatly improved accessibility to vast amounts of information, they exhibit significant shortcomings that impair user experience and the efficiency of information retrieval and subsequent use of that information for business or personal applications.

Other tools and software applications provide search results but lack the capability of creating and dynamically updating knowledge bases which can contain information that would be valuable for future searches or other requirements for specific data access.

With the advent of neural networks and artificial intelligence techniques, such as Large Language Models (LLM) and other generative AI methods, improved search techniques, Retrieval Augmented Generation (RAG) methods have been proposed. Such techniques use AI methods, such as LLM, to analyze and index it according to complex, multi-dimensional vectors, producing one or more RAG databases. The same generative AI system can then analyze the similarity between the various multi-dimensional vectors (often using dot product techniques) to find relationships between input questions and the vector indexed data. Although initially introduced for text input data using LLM methods, more recently other types of input data have also been analyzed according to various multimodal Retrieval Augmented Generation (multimodal RAG) methods.

Prior art in this area includes US patents and patent applications U.S. Pat. Nos. 5,586,218, 6,094,649, US2010/0030734, U.S. Pat. Nos. 7,069,254, 9,058,362, 11,645,479, 11,948,560, 7,716,148, 9,858,343, and TW200903267; the entire contents of these applications are incorporated herein by reference.

Various multimodal RAG database techniques have been taught by Surla et. al, "An Easy Introduction to Multimodal Retrieval-Augmented Generation, Mar. 20, 2024, Nvidia; as well as by Zhu et. al., "REALM: RAG-Driven Enhancement of Multimodal Electronic Health Records Analysis via Large Language Models (2024) arXiv: 2402.07016v1 [cs.AI] 10 Feb. 2024, Chen et. al., "MuRAG: Multimodal Retrieval-Augmented Generator for Open Question Answering over Images and Text", arXiv: 2210.02928v2 [cs.CL] 20 Oct. 2022; and others.

BRIEF SUMMARY OF THE INVENTION

In addition to performing targeted information search operations, the present invention also utilizes Multimodal RAG techniques, and other methods, to provide a specialized searchable knowledge base that is established and then automatically updated or expanded as a function of search activity initiated by search agents or users. AI, ML and curation processes ensure the quality and relevance of the knowledgebase and also any updates or additions that are made to it. The knowledgebase function, which may optionally be administrated by a knowledge base manager, can also generate reports, alerts, activity logs, and other information automatically or upon request.

The invention is based, in part, on the insight that some of the problems with prior art include:
   Limited Information Delivery: Traditional search engines and search tools primarily provide URLs that link to external web pages without offering substantial insights about the content of those pages directly within the search results. Users must visit each link separately to determine the relevancy and quality of the content, which is time-consuming and inefficient.
   Absence of Content Curation: The information returned by conventional search engines and tools is often raw and unfiltered. This lack of curation can overwhelm users with irrelevant, low-quality, or outdated content, making the search process less effective and more labor-intensive.
   Restricted Access and Interaction: Current traditional search tools do not allow for interactions beyond the retrieval of static web page links. They are unable to open web pages, fill out forms, or access content behind paywalls or subscription-based services. This severely limits the scope of information accessible through a single search query.
   Over reliance on Specific Keywords: Traditional search tools heavily depend on keyword matching for generating results. The method often fails to grasp the context and intent behind user queries, leading to mismatches between user expectations and the search outcomes provided.
   Highly dependent on user input to determine where to do searches for resources. They are generally unable to independently evaluate various alternatives and to make decisions on what to incorporate in their search results.
   Lack of Integration and Personalization: Traditional search tools offer limited personalization options and are generally not well-integrated with other tools and platforms that users may employ. This lack of integration requires users to manually bridge the gap between the retrieval of information and its application or use in various contexts.
   Lack of knowledge base: As information searches are conducted and the most relevant information sources are identified, information about those sources is not acquired or automatically stored as part of a knowledge base. This results in wasted effort in repeating searches to find relevant sources and does not allow different applications or people to build a common collaborative knowledge base for future work efforts.

Given these significant limitations, there is a clear need for an improved information search tool that can deliver curated, contextually relevant information directly to the user, provide broader access to restricted content, and enhance the overall user experience through greater integration and personalization features. There is also a complementary need to automate the process of creating knowledge bases from search activities to improve the efficiency and reusability for related follow-on activities.

Such improvements are essential to address the evolving needs of modern information consumers and to leverage the full potential of digital information accessibility, usability and efficiency.

In some embodiments, the invention may be a system or method of using an intelligent search agent to search a knowledge base. Here the invention can comprise using at least one computerized system to accept search input and interpret the search input, thus producing interpreted input. Then using an intelligent search agent and the interpreted input to search this knowledge base. Here the intelligent search agent can comprise at least one AI system. Note that when this intelligent search agent finds information in the knowledge base that matches at least some of the interpreted input, then the invention will return at least some of this information as response information.

In some embodiments, the invention can also comprise building this knowledge base using an AI enabled system and a plurality of different data sources.

Further, in some embodiments, the invention can also comprise using any of the search input, interpreted search input, response information, and this AI enabled system to further build (e.g. extend) the knowledge base. This allows the system to intelligently extend (e.g., dynamically grow) the knowledge base depending on search demand and success/failure of previous searches.

In some embodiments, the invention can comprise an AI enabled platform and system including an AI enabled search agent with functions and capabilities as will be described herein. These features and capabilities can include:

AI processes, automation, algorithms, and transaction flow

Knowledge Base formation with knowledge base management

Curated output and integration with workflows

Automated form filling and website authentication and/or user interaction when needed Prompt suggestion functions Token optimization functions Knowledge base and search results integration with workflows Preferred embodiments of the present invention include:

An intelligent search agent that can accept search request input in various ways to initiate a search of databases, websites, documents, PDF files, photos and other digital data. Search requests can be initiated manually, through automated scheduling, and other ways and can be initiated in multiple ways including voice input, text input, form filling, large language model (LLM) processes, AI agents, selecting from dashboard menus, computer instructions and other methods. Applications of machine learning (ML) and natural language processing (NLP) and others are used to enhance the search agent's capabilities while minimizing user effort requirements.

A search agent that uses AI capabilities such as large language model (LLM) processing, textual analysis, and others to determine the type of search and type of information that's being requested. It will also determine the best sources of information based on its AI processing capabilities and historical information derived from a knowledge base that it builds and maintains.

An AI enabled system that acquires information from various sources, and subsequently builds a knowledge base. It also has a knowledge base manager and/or agent organizes and dynamically updates one or more knowledge bases. Collaborative knowledge bases can also be formed by combining the search activities of one or more entities or people.

In some embodiments, the invention can navigate through various websites and databases and can form fill and enter those (also perform web scraping activities).

In some embodiments, the invention can automatically synthesize the search results into user or machine-readable information.

After acquiring information from search activities, the search agent works with complementary applications to curate and format the information into final forms including natural language abstracts, machine instructions, audio output, or form filled templates.

The invention also includes embodiments related to systems comprised of circuitry, computer processing units, graphical processing units, combinations of hardware, firmware, and software configured to execute the methods disclosed in this application.

Algorithms supporting AI processing and data management are also disclosed.

Other embodiments of the invention can include a method and process for time-series forecasting and imputing using automated feature extraction and static machine learning models.

The advantages and benefits of having the knowledge base automatically updated and kept current are many, including ensuring that the knowledge base remains relevant and accurate, reducing the risk of decision making based on outdated information.

The AI technology and processing described in this concept enables knowledge bases to be updated as a function of new search activities. It can also systematically scan for new sources to assess their credibility based on predefined criteria and can incorporate them into the knowledge base without user intervention. It eliminates manual labor, opportunities for errors, or omissions and increases the value and accuracy of the knowledge base.

A further benefit as shown in FIG. 6, is having the ability to temporarily combine 2 or more knowledge bases when desired for specific projects or purposes. The knowledge bases can also be permanently combined if desired.

Curated AI processed search results that create language or machine-based summaries of information that has been acquired from disparate sources such as websites, PDF documents, databases, or other types of information repositories.

Search Agent with the capabilities of reviewing websites, accessing restricted websites using form filling and password presentation capabilities, and others.

Use of LLM and other technology eliminates (or at least reduces) the dependence on specific words, metatags, or phraseology.

Search agent AI logic is able to make decisions and identify other sources of information on its own:

Human-like Interaction: Search Agent simulates natural conversations, offering a more engaging and intuitive interaction experience for users.

Personalization: These chatbots analyze user defined knowledge base to deliver tailored responses, ensuring a bespoke experience that caters to individual preferences of each avatar.

Contextual Understanding: Search Agent retains context throughout conversations (often through use of a learning database), adapting responses based on previous dialogue for more meaningful interactions.

Dynamic Learning: With machine learning capabilities (augmented by learning database methods that can preserve context between sessions), the invention can continuously improve responses over time, adapting to evolving user needs and preferences.

Enhanced Engagement: Human-like interaction and personalized experiences foster deeper user engagement within digital twin environments.

Efficiency and Scalability: Instant responses and streamlined communication processes improve efficiency, while scalability accommodates a growing user base.

Seamless Integration: Integrating Search Agent with digital avatars creates a seamless conversational interface, enhancing immersion and communication.

Improved User Experience: Contextual understanding and dynamic learning lead to more meaningful interactions, elevating the overall user experience within digital twin applications.

Search results are presented in a personalized or customized manner through integration with AI powered information dashboards and user screens.

Dynamic knowledge base concepts with an associated 'knowledge base manager' that builds knowledge bases based on user confirmations, machine learning, and other knowledge base management parameters that are established. (example: age of information)

The knowledge base and knowledge base manager can also form collaborative knowledge bases based on the independent or coordinated work of two or more individuals or machines, Important components of the invention can include:

Computer system with data processing capabilities containing software that performs the functions as described in this invention Search Agent with AI capabilities, novel features, AI and data analysis algorithms, and transaction flow Knowledge base manager with unique functions, features, and transaction flow, automated updating, reporting, and communications Knowledge base with improved functions and features Application of algorithms and transaction flow

BRIEF DESCRIPTION OF THE DRAWINGS

FIG. 7. Shows one example page (a main page) of search results from a search of a large number of websites and bulletins related to available government funding.

FIG. 8. Shows one example page of a knowledge base being formed from search results and the management thereof.

DETAILED DESCRIPTION OF THE INVENTION

Figure 1:
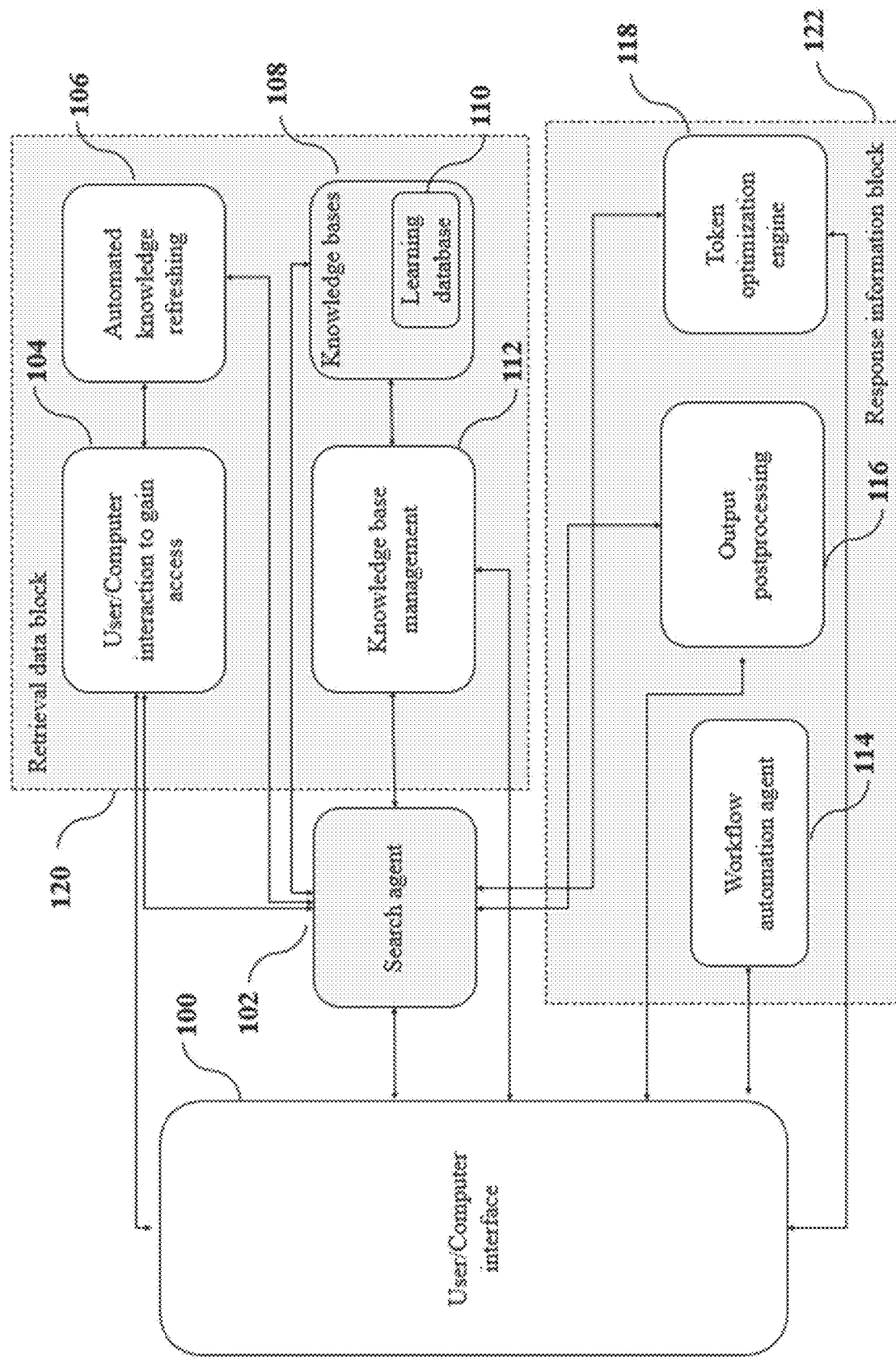
FIG. 1 shows high-level overview of system architecture (each block is isolated on figures below) in accordance with the present invention.

In some embodiments, the invention may be a method of using an intelligent search agent to search a knowledge base comprising a plurality of data items indexed according to a multimodal Retrieval Augmented Generation (RAG) encoding system.

In this embodiment, the method can comprise using an intelligent search agent 102 comprising at least one processor and at least one generative AI system 122 to accept search input from at least one user 100, interpret this search input (e.g. produce interpreted search input), as well as tokenize and vectorize at least some of this interpreted search input, thus producing at least one vectorized query for a present search 120. Here, the search that is being conducted presently will be called a "present search", while searches that may be done in the future will be termed a "subsequent search."

The method then uses the intelligent search agent and this at least one vectorized query to search at least some of the knowledge base 108, and determine at least some data items with indexes that show significant similarity with the at least one vectorized query, thus producing retrieved data items.

In a preferred embodiment, the knowledge base generally comprises a plurality 112 of different RAG databases 108, each different RAG database comprising a plurality of data items, each data item indexed by a vector generated by at least one of the various Generative AI systems acting upon a tokenized version of that respective data item. Here, this will generally be referred to as a "vector indexed data item."

Here, the intelligent search agent uses at least some of these retrieved data items, and the search input, to return at least some information from the knowledge base. This returned information is generally referred to as "response information". Information that it further refined for user or computer interface as final step is processed by generative AI in response information block 122, by postprocessing the search agent output 116, optimizing the number of used tokens 118, and automating workflows 114.

Further, in a preferred embodiment, for at least some of the various users, the intelligent search agent further uses any of the search inputs, interpreted search input 104, tokenized search input, at least one vectorized queries, and the response information to create a learning database 110 for use in any of the present search and for use in subsequent searches.

The invention includes an AI enabled search agent (intelligent search agent) with improved capabilities for conducting targeted automatic searches of online, Internet based, active and legacy databases, files, websites, publications, and other digital materials using inputs and/or AL gleaned reference information from a range of sources 106. FIG. 1 describes an overall architecture for the present invention, that includes key software functions and their relationship to the search agent.

Note that this intelligent search agent will generally comprise a mixture of software, hardware (standard computer configurations paired with graphical processor units (GPU) with appropriate power matched to the demands of the LLM that is used in each embodiment) and also can include various local and cloud computing resources and the like that can be used to implement the desired type of generative AI system. Thus, the term "intelligent search agent" should be construed as being an automated system comprising the above components. Example of embodiment presents web-based frontend user interface accessible via internet browser, backend software architecture hosted on an industry standard cloud resource/server with GPU powerful enough to run latest LLMs with high inference speed or additional cloud resource/server GPU powerful enough to run latest LLMs used only to host LLM.

About the "Learning Database"

A common problem with other generative AI systems is that many do not retain information between different sessions. That is, the generative AI system, even if supplemented by various RAG databases, does not retain information between different sessions. In other words, prior art generative AI and RAG methods tend to be deficient in their ability to learn and grow from experience.

By contrast, this invention contains at least one learning database 110 that is different from both the generative AI weights, and is also usually different from the various RAG databases used to store outside facts and information. The learning database (which may optionally have a RAG database component) is configured to store information related to present and previous searches, present or previous response information, and optionally (but preferably) also information pertaining to the success of the previously responses. This lets the system know, for example, that if a certain type of search often queries a certain type of RAG database, but the results are often scored (automatically, or by a user optionally) as being inadequate, then the system should strive to either automatically extend the inadequate RAG database or strive to automatically construct additional RAG databases 112. Similarly, if a given RAG database is found to be very popular and successful, the system may strive to further optimize or extend that RAG database as well.

The invention includes an AI enabled search agent with improved capabilities for conducting targeted searches of online, Internet based 202, active and legacy databases 220, files 222, websites 204, subscription-based documents and databases 206, photos 208, videos 210, audio files 212, and other digital materials 214 using inputs and/or AL gleaned reference information from a range of sources.

The search agent can accept inputs from users, computers, and other sources to initiate an AI enabled information search process. The search agent has specialized related AI technology powered capabilities including being able to glean reference information from source databases, files, or user generated inputs to create its own search parameters.

Because sources of information can come in many forms such as websites, subscription-based documents and databases, photos, videos, audio files, and other forms of digital files 108, the search agent also incorporates sophisticated capabilities to navigate to source materials and to negotiate the required methods 304, 306 to enter websites, open documents, to access and present passwords as needed to gain access to source information and digital knowledge bases.

Thus, as previously discussed, in some embodiments, the at least one user can be a plurality of users. Each of these users may have their own associated access information. Here, the intelligent search agent can use this associated access information to determine which of the various RAG databases and/or which of the response information is available to a given user.

When the search agent encounters sources that require user intervention or participation to gain access, the search agent can alert or prompt a user to assist. The alert or prompt can include any of sending cellular phone texts, emails, instant messaging, application interfaces, Popup windows, Notifications, and/or others.

As part of the search agent's search functions, it can also identify and suggest additional websites, documents, databases, videos, photos, etc. sources to consider including in future searches. It also utilizes algorithms for pre and post processing.

One example of pre-processing includes an algorithm which provides guidance to users for how to minimize token usage while doing their searches thereby reducing the transaction processing costs for token-based applications.

This invention also describes a concept whereby a specialized searchable knowledge base is established and then automatically screened and updated as a function of the search activities initiated by search agents or users using AI processing. It also incorporates functions allowing individuals or businesses to combine knowledge bases when desired for specific projects or purposes. For example, if two or more people, machines, or a combination are independently searching the internet or a database of information the knowledge base manager can pull information from the search agents to form a combined or collaborative knowledge base.

The general function of the system and method includes:

An initial knowledge base is established in any of the following ways:

Upload or Provide Computer Access to Legacy Files or Digital Information

User or search agent-initiated search activities add search target information to the database along with optionally generated meta data (if applicable). Include 'Crowd sourced' knowledge base generation concepts.

As candidates for the knowledge base are identified, they go through an AI enabled screening process and/or user curation process before getting added to the database. This step ensures quality and relevance of the new information to be added. ML and NLP from LLM (optional user interface) may also be implemented to improve the selection of candidates and screening process over time.

Additions to the Knowledge Base May Include Having Associated Meta Data Describing the Filter Settings that were Selected as Part of Doing a Search Knowledge bases are dynamically generated for search activities based on user login permissions and subscription details. Not all users or computers will have access to all parts of the knowledge base or, may only get access to partial information. Another key aspect is that new, automatically forming knowledge bases can be created when one or more people, computers, search agents, etc. want to collaborate. For example, if person A has a knowledge base X and person B has a knowledge base Y, then through collaboration, they can access knowledge base X and Y (e.g. for a specific project, purpose, or if they both have unique knowledge bases but want to combine them for a new type of project).

Examples of what could go into a knowledge base includes: websites, online bulletins, reports, legacy files, steaming data (news, videos, etc.), photos, metadata, machine data, and the like. Note that this based may be updated and curated, additions may be added, and exchange of information with other knowledge bases may also be implemented.

Curated AI processed search results that create language or machine-based summaries of information that has been acquired from disparate sources such as websites, PDF documents, databases, or other types of information repositories and formatting those to fit into dashboards or information presentation templates.

Tracing back retrieved information to original sources:

Another common problem with Generative AI methods is their tendency to "hallucinate" or otherwise report unreliable data. Here, improved methods of verifying system results are also useful.

In some embodiments, it may be useful to configure the system (or method) so that at least some of the various of RAG database further comprise information pertaining to an original version at least some of the data items prior to vectorization and LLM inference. This original version information can, for example, comprise any of source file location information (such as a source URL), time obtained information, or other information that enables at least some of the vector indexed data items to be traced back to their original sources.

In some embodiments, the intelligent search agent can be configured to use an index of available raw (unvectorized) data items and a machine-readable source of these raw data items to increase the various RAG databases. Here, this can be automatically extending 106 those RAG databases with additional related vector indexed data items, and/or, automatically producing additional RAG databases with additional unrelated vector indexed data items. In some embodiments, this can be done on a user-specific basis, so for either the present search or future search, at least some of the users are authorized to use some RAG databases, or portions of these RAG databases, and some are not 112. This can be used to preserve user confidentiality, and/or provide various levels of user service as desired.

Learning according to application type.

Different types of applications (e.g., fields of knowledge or inquiry) require different types of RAG databases. It is thus useful to enable the system to extend or grow its various RAG databases depending on the applications (fields of knowledge) represented by its various searches.

To do this, in some embodiments, the index of available raw (unvectorized) data items can be further automatically categorized (such as by a generative AI such as an LLM) according to least one data application type. As a result, a given search input can be determined as further comprising at least one search application. According to this scheme, then when a given search application type correlates with a given data application type, then the intelligent search agent can be configured to preferentially choose those available raw (unvectorized) data items, or those machine-readable source of raw data items, as well as those RAG databases that match this search application type. This can then be automatically used to select or increase those RAG application relevant databases for either a given present search and/or for use in future searches.

Figure 2:
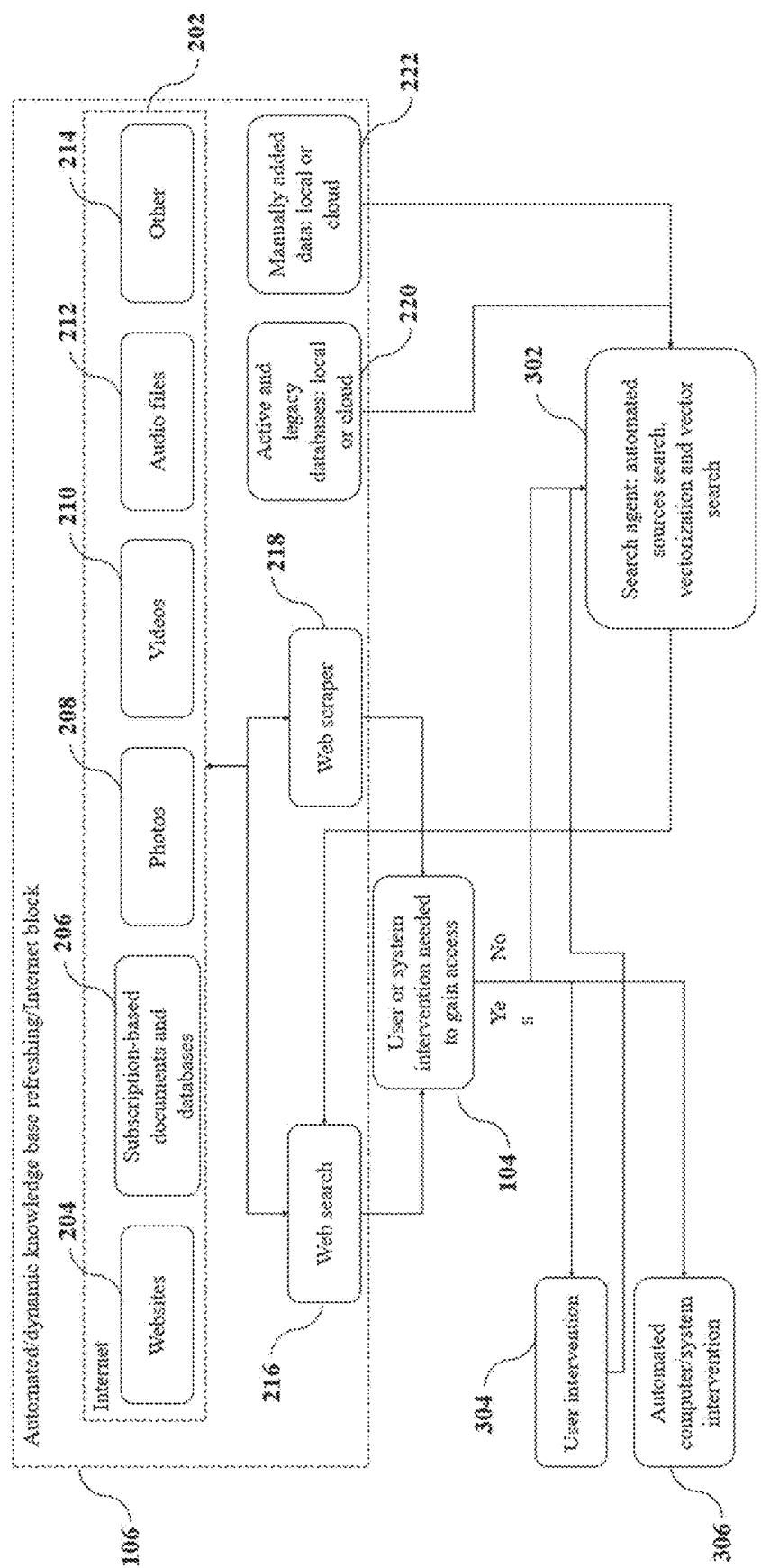
FIG. 2 shows a diagram with transactions related to automated search procedure block and sources access with connection to other subcomponents from other blocks in accordance with the present invention.

As described in FIG. 2, sources of information can come in many forms such as websites 204, subscription-based documents and databases 206, photos 208, videos 210, audio files 212, and other forms of digital files 214, the search agent 302 also incorporates sophisticated capabilities to navigate to source materials and to negotiate the required methods 104 to enter websites, open documents, to access and present passwords as needed to gain access to source information and digital knowledge bases.

Put alternatively, in some embodiments, the machine-readable source of raw data items can comprise internet data sources and websites 202. In these embodiments, the index of available raw (unvectorized) data items can comprise a web-based search engine 216 (such as Google search, Bing, Duck-Duck-Go, or other proprietary or non-proprietary search engine. Here the invention will further use at least one web scraper 218 to automatically obtain 106 at least some the raw data items from these internet data sources and websites. In some embodiments, the invention may optionally also use any of automated form filing techniques, and/or user behavior emulation to further obtain this data.

Figure 3:
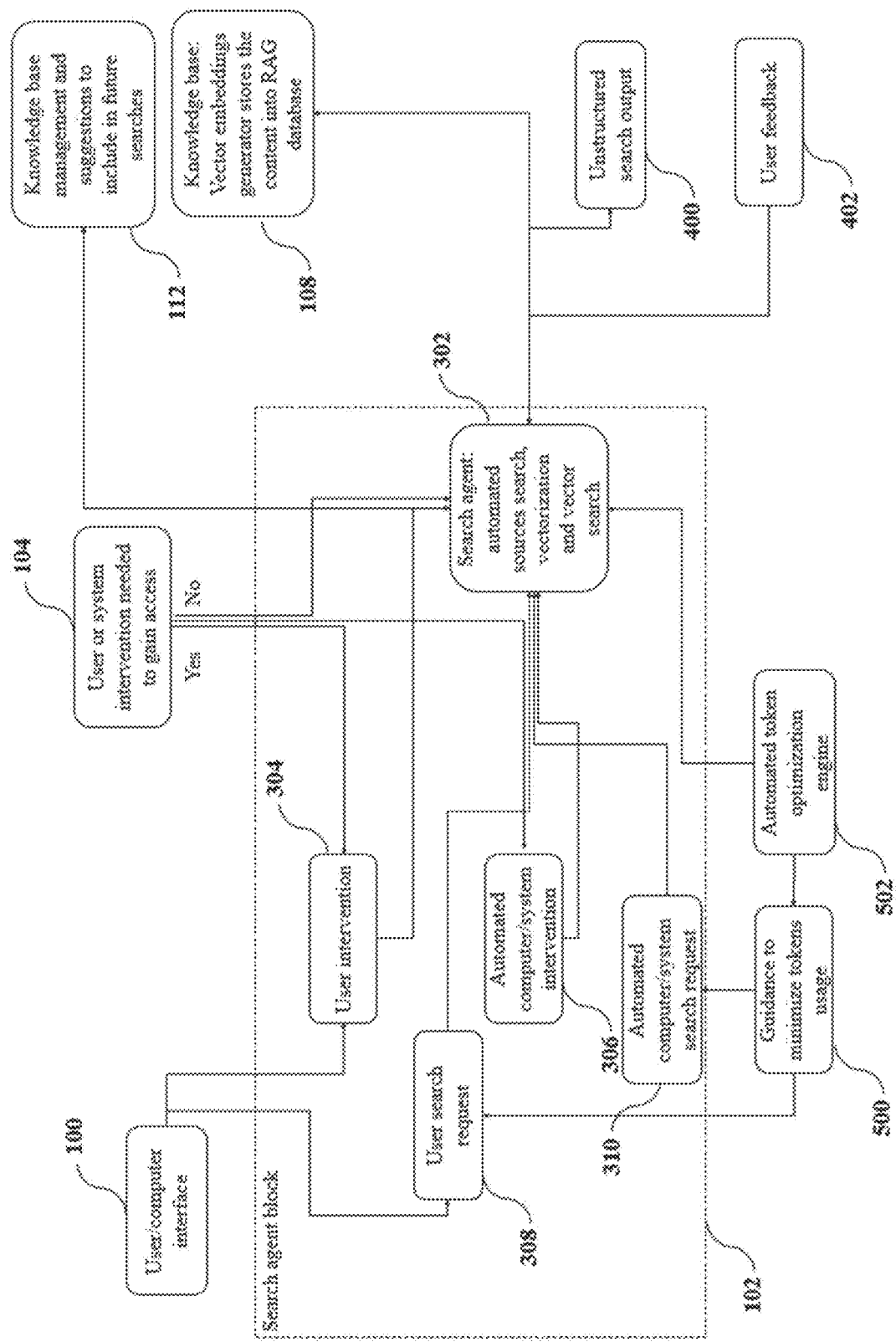
FIG. 3 shows a diagram with transactions related to search agent block with connection to other subcomponents from other blocks in accordance with the present invention.

As described in FIG. 3, the search agent 302 can accept inputs from users 308, computers, other agents, and other sources 310 to initiate an AI enabled information search process. The search agent has specialized related AI technology powered capabilities including being able to glean reference information from source databases, files, or user generated inputs to create its own search parameters. The search agent can then access and communicate with a range of sources to retrieve information the correlates to its AI or user generated search parameters, by minimizing the token usage 500. If access to some content is restricted, the search agent automatically intervenes 306, or as end case asks for user intervention 304. As a result, search agent 302, produces unstructured search output 400, and improves by taking into account user feedback 402, and inputs from automated token optimization engine 502.

Although the system is generally designed to operate automatically, in cases where the search agent encounters sources that require user intervention or participation to gain access, the search agent can alert or prompt 104 a user 304 or system 306 to assist. The alert or prompt can include any of sending cellular phone texts, emails, instant messaging, application interfaces, Popup windows, Notifications, and/or others. FIG. 2 describes a transaction flow illustrating how the system can alert and interact with users when necessary.

As shown in FIG. 3, this invention also describes a concept whereby a specialized searchable knowledge base is established and then automatically screened and updated as a function of the search activities initiated by search agents or users using AI processing. As shown in FIG. 8 the system also incorporates functions allowing individuals or businesses to combine knowledge bases when desired for specific projects or purposes. For example, if two or more people, machines, or a combination are independently searching the internet or a database of information the knowledge base manager can pull information from the search agents to form a combined or collaborative knowledge base.

As part of the search agent's search functions as shown in FIG. 3, it can also identify and suggest additional websites, documents, databases, videos, photos, etc. sources to consider including in future searches. It also utilizes AI and data analysis algorithms for pre and post processing.

Figure 4:
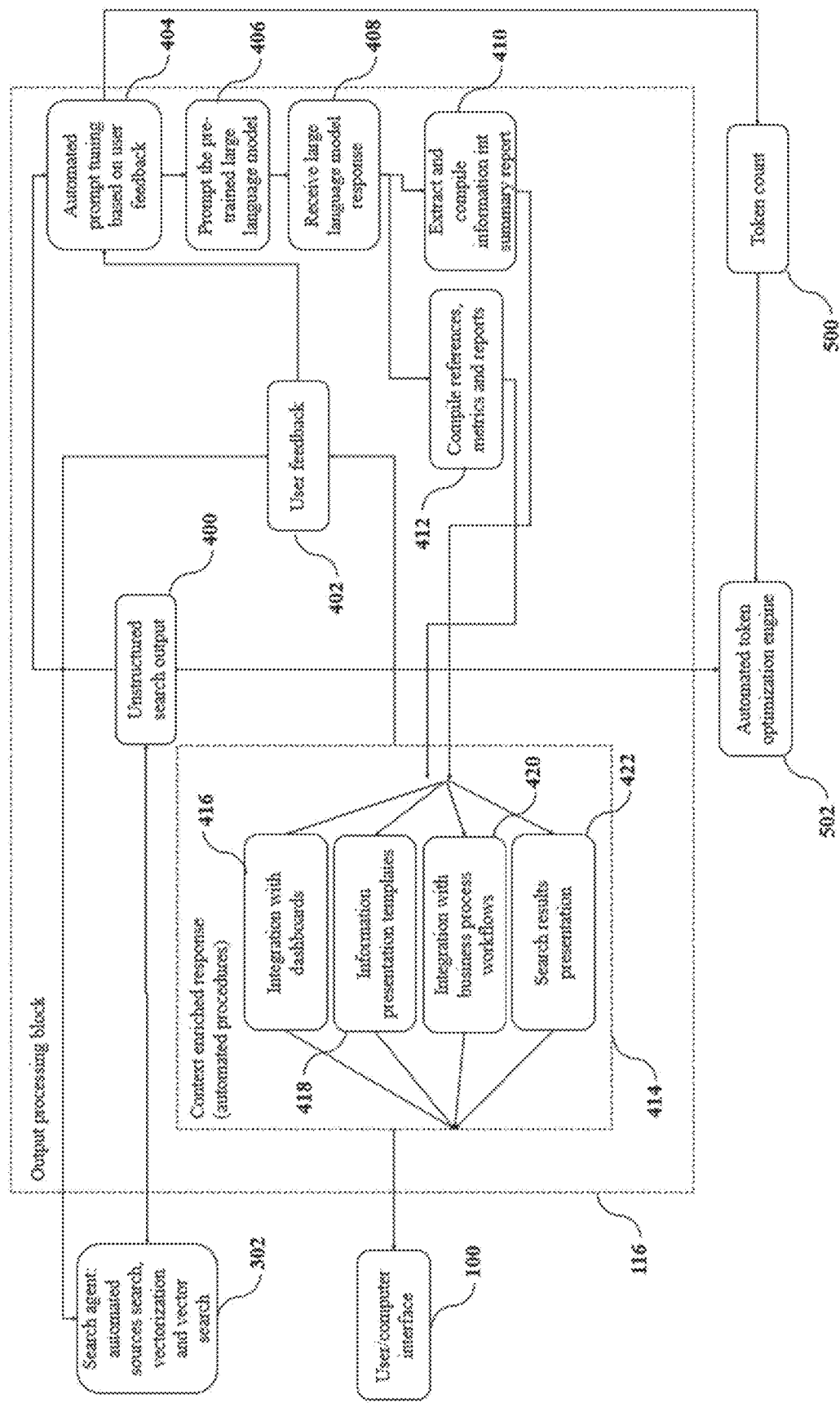
FIG. 4 shows a diagram with transactions related to output processing block with connection to other subcomponents from other blocks in accordance with the present invention.

Upon accessing source information that the search agent is searching and producing an unstructured search output 400, it uses its AI capabilities to match search parameters to source information and then it extracts and compiles that information into a summary report 410 that can include any of audio, video, photo, or written language based. As shown in FIG. 4, the report generation capability of the agent is configurable to include capabilities such as graphically indicating source information to search information match, calculating and presenting 'match or relevance' metrics, references to the source material used for the compiled information, or other reports based on user preferences.

Thus, in some embodiments, the various different RAG databases and the multimodal Retrieval Augmented Generation (RAG) encoding system may be used to encode and store data types comprising any of text data, image data, video data, and audio data 406, 408. Here, in a preferred embodiment, the at least one generative AI system is automatically chosen according any of at least some of the data types or according to at least some of a data type language, data type producer, or data type subject matter.

Figure 5:
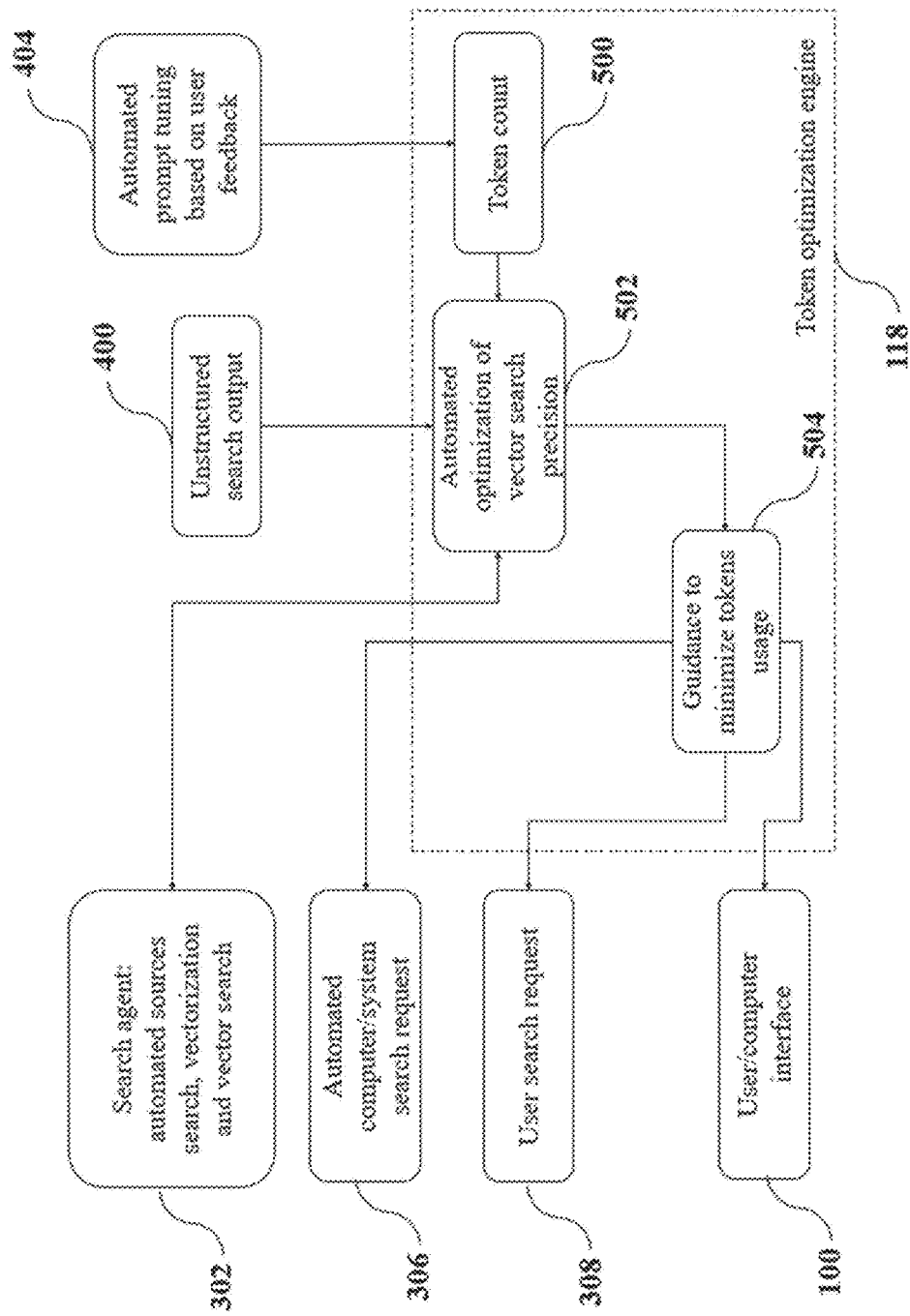
FIG. 5. shows a diagram with transactions related to token optimization engine block with connection to other subcomponents from other blocks in accordance with the present invention.
Figure 6:
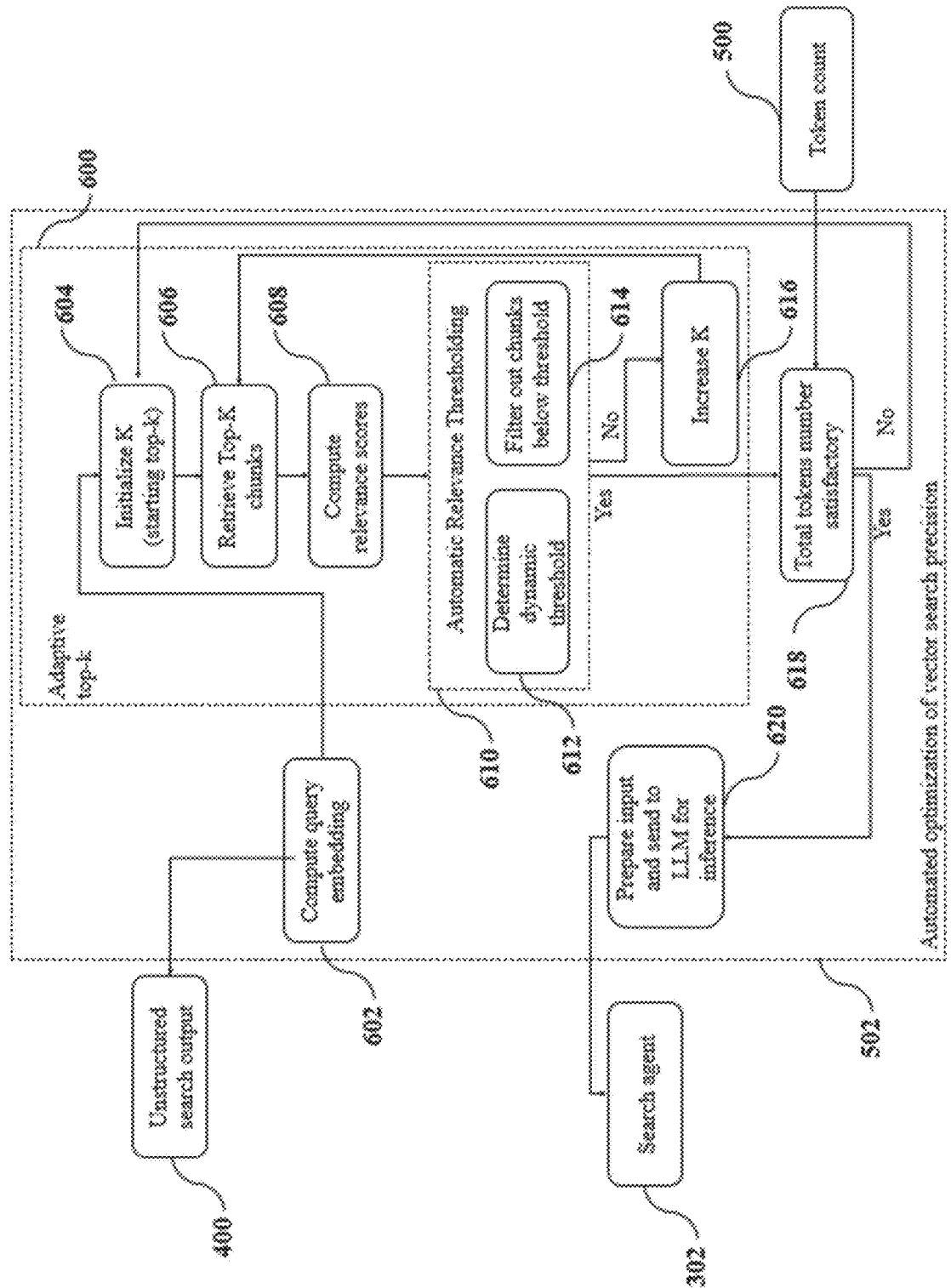
FIG. 6. shows a diagram with transactions related to token optimization procedure within the "automated optimization of vector search precision" block in accordance with the present invention.

One example of processing includes an algorithm which provides guidance to users for how to minimize token usage 500 (while doing it automatically during the search 502) while doing their searches thereby reducing the transaction processing costs for token-based applications. The token optimization module is showed in FIG. 1 and is integrated into the general transaction flow as an optional function. FIGS. 5 and 6 describes additional details of the token optimization function. Another processing 116 function described in FIG. 4 includes the capability to assist users with automated prompt engineering 404 steered by user feedback 402, by suggesting prompts used as inputs to the search agent 302 which may yield more accurate search results 400.

Upon accessing source information that the search agent is searching, it uses its AI capabilities to match search parameters to source information and then it extracts and compiles that information into a summary report 410 that can include any of audio, video, photo, or written language based. The report generation capability of the agent is configurable to include capabilities such as graphically indicating source information to search information match, calculating and presenting 'match or relevance' metrics, references to the source materials used for compiled information 412, or other reports based on user preferences.

Additionally, information retrieved from various digital source or one or more knowledge bases can be integrated into a company's existing workflow 114 by having the information be automatically formatted and integrated into other dashboards 416, working documents, templates 418, databases, websites, or other files 420 to eliminate the need for manual data entry or other reformatting for presentation 422 of the data before its use with other applications, users 100 or documentation.

The need for individuals and businesses to conduct information searches or monitor online resources for specific information is a crucial part of daily operations. This repetitive task is about staying competitive, informed, and proactive in various fields ranging from market research to technological advancements, or business alerts and changes. The internet, databases, and other digital assets can be large and searching through all of this information to find relevant, reliable, and timely content requires a structured approach which includes keeping sources in a database. The sources and locations for these online and offline resources comprise the company's or an individual's "knowledge base."

However, maintaining and continuously updating a knowledge base presents a set of challenges and issues. Given the dynamic nature of the internet, with new sources of information emerging while others become obsolete, keeping the knowledge base current is a daunting task. This process is often manual, requiring significant time and effort to identify relevant new sources, validate their credibility and relevance, and to integrate them into the existing repository.

The continuous evolution of information sources online means that without an efficient automated strategy for updates, the knowledge base may not serve its intended purpose.

This invention describes a concept whereby a specialized searchable knowledge base is established and then automatically screened and updated as a function of the search activities initiated by search agents or users using AI processing. It also incorporates functions allowing individuals or businesses to combine knowledge bases when desired for specific projects or purposes.

In embodiments, the specialized search agent (based on large language model) application may integrate with, and/or include, various advanced AI systems. These can include various types of generative AI systems, including Large Language Model (generative AI) but not limited to transformer-based architectures such as GPT-4, BERT, and T5, as well as natural language processing (NLP) techniques like named entity recognition (NER), sentiment analysis, and topic modeling. The search agent is designed to process and analyze large volumes of text data from multiple sources, utilizing a vector database and retrieval-augmented generation (RAG database) to enhance query understanding and response generation. For preprocessing, advanced NLP techniques, including tokenization, stemming, lemmatization and embeddings, may be employed to prepare raw text data for analysis. Once preprocessing is complete, the search agent uses vector databases to store and index text embeddings, enabling efficient retrieval of relevant information. The system leverages transformer-based models, combined with RAG techniques, to generate contextually relevant responses by retrieving pertinent documents and integrating them into the response generation process. Each response undergoes validation checks, including relevance scoring, semantic similarity assessments, and optional feedback loops from users to ensure precision and usefulness. This mechanism enables the search agent to deliver precise, context-aware search results and recommendations, thereby enhancing user experience and decision-making processes in specialized domains.

In some embodiments, the invention may employ different types of data preparation methods and token optimization methods may be used. For example, in some embodiments, the related vector indexed data items are usually tokenized and vectorized by the same generative AI system, and these data items have indexes with at least above random similarity with each other, thereby producing extended RAG databases with related vector indexed data items. By contrast, the unrelated vector indexed data items are either tokenized and vectorized by different generative AI systems, or the data items may have indexes with only random similarity with each other, thereby producing additional RAG databases with unrelated vector indexed data items for any of the present search and for use in future searches.

As previously discussed, in some embodiments, the at least one generative AI system comprises at least one type of Large Language Model type system.

Further, in some embodiments, the at least one generative AI system can comprise at least one type of Large Language Model type system, and this at least one alternative generative AI system configured to directly process any of image, video, and audio data.

Using user feedback to help the system automatically "learn" and improve:

As previously discussed, a useful feature of the present invention is its use of at least one learning database to preserve results between sessions. This learning database can also serve as a source of information to enable the system to automatically expand its capabilities.

More specifically, in some embodiments, the intelligent search agent can be further configured to request user feedback on its response information. This user feedback can then be automatically incorporated into the learning database. In other words, the learning database further comprises feedback information obtained from the response information. Here, the intelligent search agent can be further configured to use its learning database and this user feedback to determine additional raw data items to use to increase its RAG databases for any of a present search and also for use in future searches.

As an example, the intelligent search agent can be configured to automatically use its learning database to determine which of its various RAG databases was used to produce retrieved data items with highest significant similarity over a plurality of searches. This finding can be used to enable the system to automatically extend those "successful" RAG databases with similar vector indexed data items. Thus, making a bigger "successful RAG database". Alternatively (for example, if the RAG database size is getting too large), the system may instead automatically produce additional RAG databases with similar vector indexed data items. These can then be used for a given present search as well as used for future searches.

Regarding the term "knowledge base":

As previously discussed, the invention's "knowledge base" typically comprises a plurality of Retrieval Augmented Generation (RAG) databases. In addition to the RAG databases, other sources of information, including information encoded in Generative AI weights (or coefficients), memory storage buffers for incoming data, learning databases (which, for example, store session information between sessions so that the system can learn from experience) and other sources of information are also available. Occasionally, however, it can be useful to refer to this disparate collection of information as a "knowledge base".

In some embodiments, the initial knowledge base is established by uploading or otherwise providing computer access to legacy files or digital information. As shown in FIG. 3, in some embodiments, user or search agent-initiated search activities can optionally add search target information to the database along with optionally generated meta data (if applicable). This data can include 'Crowd sourced' knowledge base generation methods.

As candidates for the RAG portion of the knowledge base are identified, they go through an AI enabled screening process (an optional user curation process may also be used) before getting added to the various RAG databases. This step ensures quality and relevance of the new information to be added. ML and NLP from LLM (optional user interface) may also be implemented to improve the selection of candidates and screening process over time.

Additions to the RAG portion of the knowledge base may include having associated meta data describing the filter settings that were selected as part of doing a search In some embodiments, the RAG portion of the knowledge may be dynamically generated for search activities based on user login permissions and subscription details or AI agents. In a preferred embodiment, not all users or computers will have access to all parts of the knowledge base or may only get access to partial information, usually based on various user permission or access criteria. Another aspect is that new, automatically forming knowledge bases can be created when one or more people, computers, search agents, etc. want to collaborate. For example, if person A has access to knowledge base X and person B has access to knowledge base Y, then through collaboration, the system can be configured to allow both users to access knowledge base X and Y (This permission may be temporary, such as for a specific project, or purpose). Alternatively, with proper access, both users may decide to combine at least portions of their various knowledge bases on a more long-term basis, such as for a new type of project).

As previously discussed, examples of what could go into the various RAG database portions of the knowledge base includes: websites, online bulletins, reports, legacy files, steaming data (news, videos, etc.), photos, metadata, machine data, etc., etc.

Additional features of the present invention provide incremental improvements and capabilities in order to enable access websites or other types of databases, to optimize search processes, and to facilitate integration of search and knowledge base results with workflows and business processes.

Token optimization engine feature is shown in FIG. 5: When a vector database (RAG database) is searched (semantic/vector search) and output produced 400, search accuracy is used as preset parameter to retrieve the text chunks based on searched keywords. Generally, higher preset accuracy will result in fewer text chunks but more semantically similar. However, high preset accuracy in most cases doesn't return text chunks at all since the search criteria are not met. Also, high accuracy generates more precise results (less and smaller text chunks) if it exists and reduces token number for LLM. Therefore, the automated graceful degradation of performance 502 through search precision lowering is employed to minimize the use of tokens 500 for LLMs produced from tuned prompt 404 and provide guidance for optimization 504 to user/computer interface 100, or search requests 306, 308. However, data for automated improvement is fed directly to search agent 302, by using automated procedure that is a combination of adaptive top-k algorithm paired with automatic relevance thresholding.

More detailed breakdown of automated procedure from block 502 is shown in FIG. 6. After the search output is retrieved 400 and embeddings computed 602, the procedure starts with adaptive top-k algorithm 600 that begins with small K value 604. For each query, a vector search is performed to retrieve most similar text chunks (top-k) 606. If the results don't have high relevance scores 608, K is incrementally increased 616 until the retrieved chunks reach a satisfactory relevance level or until maximum K is reached to prevent high use of tokens for LLM inference. After that the automatic procedure for relevance thresholding 610 calculates similarity scores (industry standard metrics for vector similarity such as cosine angle between two vectors, dot product, Euclidean distance between two vectors or other) and filters out chunks 614 with scores below dynamic relevance threshold. The threshold can be based on distribution of scores (e.g. mean minus standard deviation) or any other dynamic formula 612. Finally, the total token count 500 is used to determine if the procedure needs to be repeated with narrowed relevance threshold or ranking chunks and selecting the top ones until the satisfactory token limit is met 618. As final step, input is prepared to be sent LLM for inference 620 and information forwarded to search agent 302.

Descriptions for some of the features included in workflow optimization agent 114:

A generative AI classifier (such as an LLM classifier) for different technologies and areas of knowledge: The range of technologies/areas of knowledge (or any keywords in wider application) is diverse and it often doesn't fit in predefined use case templates (for example green energy, renewable energy, electric vehicles, decarbonization can all be classified in clean energy class). Since LLMs are typically pre-trained on large text corpus, with properly engineered prompts all categories can be classified to desired set of categories. Additionally, if category/keyword doesn't exist, LLM can be used to automatically extract it from the text context.

LLM (or other generative AI) formatter for dates: Date formats are also diverse and usually don't fit in predefined use case templates (for example one source has "Q1 2025" as deadline, another "September of following year" etc. but a use case may require a MM/DD/YYYY format). Since LLMs are pretrained on large text corpus, with properly engineered prompt all date formats can be formatted to desired approach. Additionally, if date is not already extracted from the source, LLM will extract it from the text context vs a designated or standard date field.

Automated web browser interaction: Search functionality is supported by the automation capabilities for web scraping that includes having the ability to automate web browsers and interact with dynamic content. The system can be configured to handle sites that cannot be scraped using hyperlinks, simulating real user actions like clicking and typing. With this approach, the search application can navigate through pages, click on items, move mouse and fill forms making it ideal for scraping websites that require such interactions.

Note that in some embodiments, the intelligent search agent may be configured to use a learning database to determine which of the various different RAG databases produce retrieved data items with lower significant similarity over multiple searches, thus determining at least one suboptimal RAG database. In this case, the invention may use any of an alternative generative AI system or and an alternative token optimization method, and use data items from this at least one suboptimal RAG database to produce at least one candidate reformatted RAG database.

The value of this at least one candidate reformatted RAG database can further be automatically evaluated by, for example, automatically determining, over multiple searches, if this candidate reformatted RAG database would have produced a higher significant similarity over the various searches, thereby testing the at least one candidate reformatted RAG database. Then, if this tested candidate reformatted RAG database turns out to be superior to the known suboptimal RAG database, then the system can automatically add this at least one tested candidate reformatted RAG database to the overall knowledge base for any of a present search and/or for use in future searches.

Note that in some embodiments, the invention may employ various alternative token optimization (minimization) methods. Here, the various token optimization methods may be determined by an automated iterative search that is biased towards finding the smallest number of tokens that produces higher significant similarities over a plurality of searches, thereby defining preferred token optimization method data. In such embodiments, it is also useful to employ add this token optimization method to a learning database, thus storing this preferred token optimization method data in the learning database for future use.

More specifically, in some embodiments, the invention may employ an alternative token optimization method that further comprises at least one token optimization method that uses a combination of adaptive top-k algorithms and automatic relevance thresholding to determine the preferred token optimization method.

Other optimization methods. In some embodiments, the invention may also use domain specific trained small language models (SLMs) for tasks such as classifier for technologies or formatter for dates, etc. Usage of such locally hosted SLMs can minimize dependance on resource intensive LLM hosting machines and unnecessary large models for such tasks.

Utility for Workflow Automation

Workflow automation streamlines tasks such as web search, form filling, and data structuring. LLMs that are implemented can interpret natural language instructions to extract relevant information, and summarize or structure the data. The application can automatically fill out forms by understanding and entering the required information based on context. Paired with powerful IT architectures, variety of organizational workflows can be improved by reducing manual effort and ensuring consistency in repetitive tasks.

Use Case Example

Figure 10:
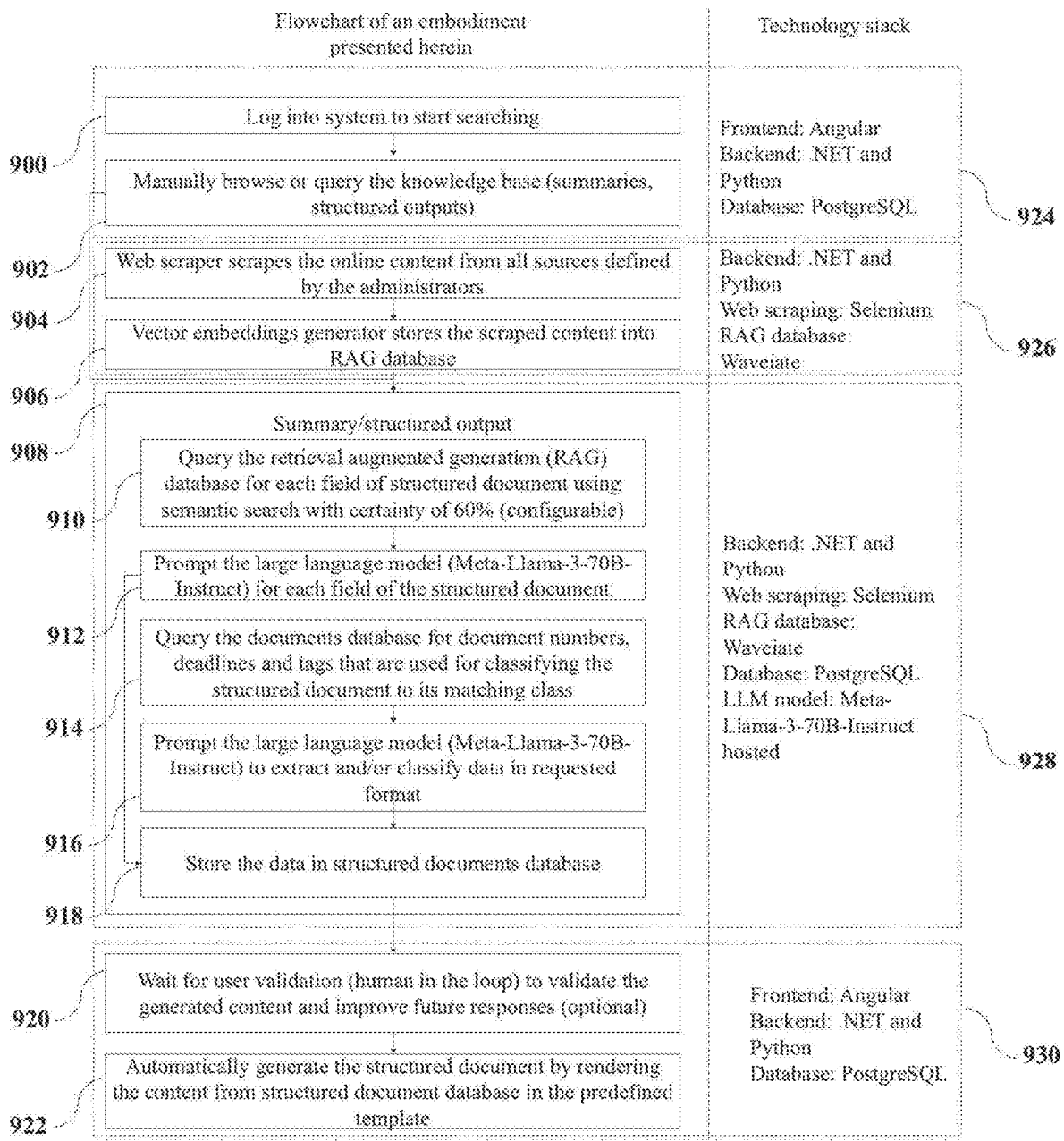
FIG. 10. Shows a transaction flow diagram for an example application where the invention is used to search government websites, PDF documents, and databases to identify and catalog government grant funding opportunities.

A transaction flow diagram for a sample use case for the invention is summarized in FIG. 10. In this example the invention is used to find and catalog government grant funding opportunities from various websites, PDF documents, and digital files, and then to organize those into a managed knowledge base and then automatically filling in templates that align with a business's workflow and documentation generation requirements.

Thus, in some embodiments, the invention will often automatically format the response information for any of dashboards, reports, presentations, and process workflows.

FIG. 7. Shows one example page of search results from a search of a large number of websites and bulletins related to available government funding. Here the main page is shown, according to the filters "Agency", "Type", "Technology", "Status", and "FundingRange". The search is initiated automatically and results are updated automatically via a preset schedule or via a person's request. The search results are extracted from many types of source documents or websites and are formatted to fit directly into the organization's workflow. In this case, preformatted table of information.

FIG. 8. Shows an updated knowledge base summary (knowledge base page) and includes various status settings and features for a knowledge base such as providing the capability of having items removed, validated, or turned on or off for certain searches.

Figure 9:
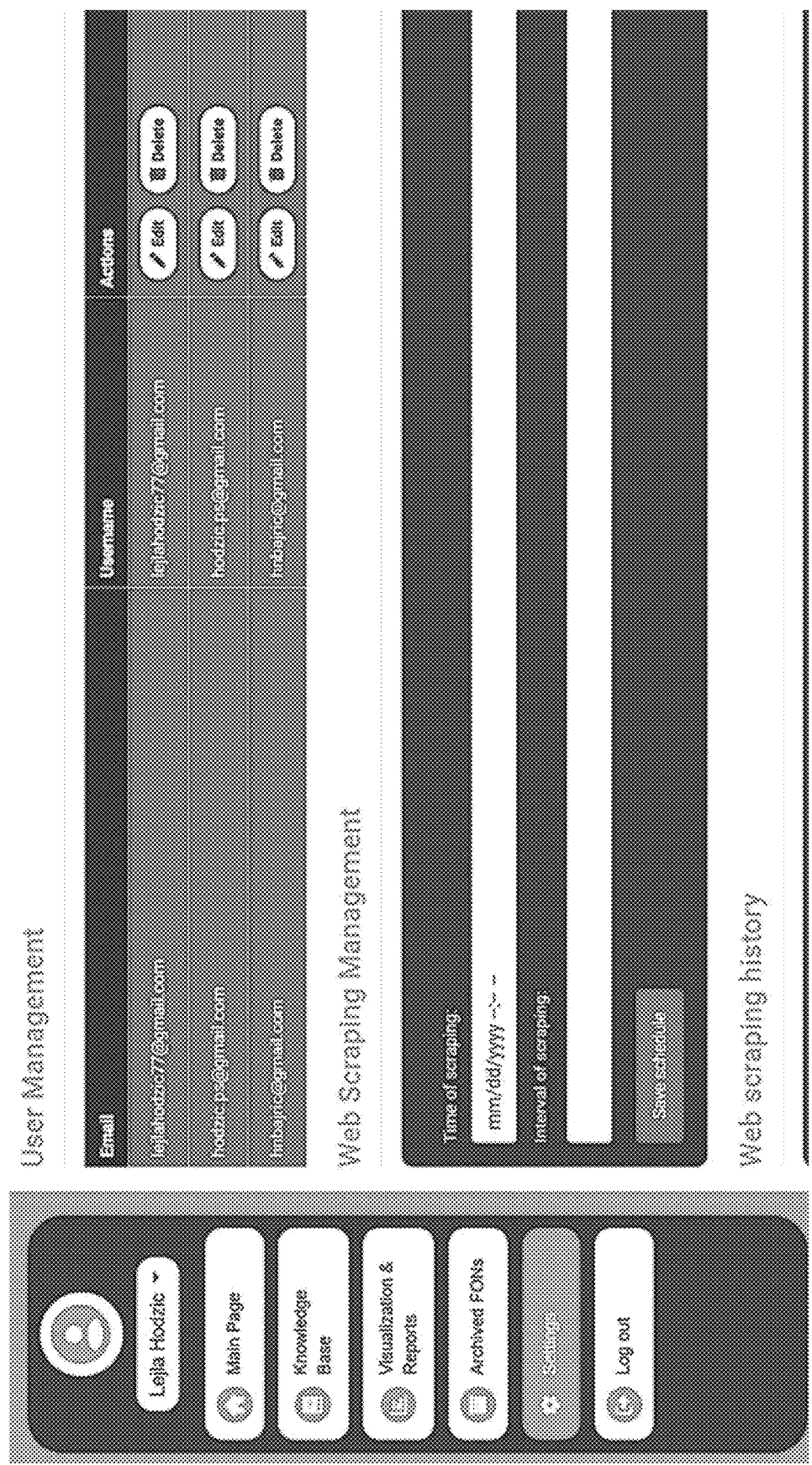
FIG. 9. Shows various capabilities such as user and/or web scraper management and things like setting up a scheduler for automated search processes and formatting text for automated template and form filling.

FIG. 9. Shows various capabilities in a system settings page, such as user and/or web scraper management and things like setting up a scheduler for automated search processes.

The sample transaction flow and technology implementation descriptions shown in FIG. 10, describes the main invention features including sophisticated search agent capabilities 924, formation and management of a related knowledge base 926, and extracting information from the knowledge base 928 (e.g. produce response information) and formatting it to automatically fill in operational templates, documentation, forms and other related documents 930 that are needed to report the results of the search and updated knowledge base. The example of transaction flow includes logging in the system to start searching 900, manually browsing the knowledge base 902, collecting the content from various sources 904, and storing the content in RAG database 906. After that the process continues to the summary output generator 908, where the RAG database is queried 910 as well as document database 914 and these responses forwarded to LLM for summarization 912 or for data extraction classification to requested format 916. After this step, the data is stored in structured document database 918. Final step in this example workflow is to wait for user validation (optional) or automatic system validation 920 and automatically generate structured documents 922.

The invention claimed is:

1. A method of using an intelligent search agent to search a knowledge base comprising a plurality of data items indexed according to a multimodal Retrieval Augmented Generation (RAG) encoding system, said method comprising:

using an intelligent search agent comprising at least one processor and at least one generative AI system to accept search input from at least one user, interpret said search input, tokenize and vectorize at least some of said interpreted search input, thus producing at least one vectorized query for a present search;

using said intelligent search agent and said at least one vectorized query to search at least some of said knowledge base, and determine at least some data items with indexes that show significant similarity with said at least one vectorized query, thereby producing retrieved data items;

wherein said knowledge base comprises a plurality of different RAG databases, each different RAG database comprising a plurality of data items, each data item indexed by a vector generated by at least one of said at least one Generative AI systems acting upon a tokenized version of that respective data item (vector indexed data item);

wherein said intelligent search agent uses at least some of said retrieved data items, and said search input, to return at least some information from said knowledge base as response information;

wherein, for at least some of said at least one users, said intelligent search agent further uses any of said search inputs, interpreted search input, tokenized search input, said at least one vectorized queries, and said response information to create a learning database for use in any of said present search and for use in subsequent searches;

said intelligent search agent is configured to use said learning database to determine which of said plurality of different RAG databases produce retrieved data items with any of a lower or higher significant similarity over a plurality of said searches, and to produce at least one reformatted RAG database depending on said determination;

wherein said intelligent search agent is further configured to autonomously interpret search inputs, query external data sources comprising raw data obtained via web scraping and pre-processed vectorized data, and execute automated interventions based on search results as an active system component; and wherein said intelligent search agent is further configured to apply one or more optimization algorithms to dynamically adjust search parameters based on computational efficiency constraints and to apply machine learning techniques to modify search strategies in response to prior search performance and user feedback.

2. The method of claim 1, wherein said intelligent search agent is configured to use an index of available raw (unvectorized) data items and a machine readable source of said raw data items to increase said RAG databases by performing at least one of automatically extending those RAG databases with additional related vector indexed data items, and automatically producing additional RAG databases with additional unrelated vector indexed data items for said at least one user for any of said present search and for use in future searches.

3. The method of claim 2, wherein related vector indexed data items are tokenized and vectorized by the same generative AI system, and said data items have indexes with at least above random similarity with each other, thereby producing extended RAG databases with related vector indexed data items; and said unrelated vector indexed data items are either tokenized and vectorized by different generative AI systems, or said data items have indexes with only random similarity with each other, thereby producing additional RAG databases with unrelated vector indexed data items for any of said present search and for use in future searches.

4. The method of claim 2, wherein said intelligent search agent is further configured to request user feedback on said response information, said learning database further comprises feedback information obtained from said response information, and said intelligent search agent is further configured to use any of said learning database and said user feedback to determine additional raw data items to use to increase said RAG databases for any of said present search and for use in future searches.

5. The method of claim 2, wherein said intelligent search agent is configured to use said learning database to determine which of said plurality of different RAG databases was used to produce retrieved data items with highest significant similarity over a plurality of said searches, and perform at least one of automatically extending those RAG databases with similar vector indexed data items, and automatically producing additional RAG databases with similar vector indexed data items for any of said present search and for use in future searches.

6. The method of claim 2, wherein said intelligent search agent is configured to use said learning database to determine which of said plurality of different RAG databases produce retrieved data items with lower significant similarity over a plurality of said searches, thereby determining at least one suboptimal RAG database; and use any of an alternative generative AI system, and an alternative token optimization method, to use data items from said at least one suboptimal RAG database to produce at least one reformatted RAG database;

and automatically determining, using said plurality of said searches, if said reformatted RAG database would have produced a higher significant similarity over said plurality of said searches, thereby testing said at least one reformatted RAG database;

and if said tested at least one reformatted RAG database is superior to said suboptimal RAG database, then adding said at least one tested reformatted RAG database to said knowledge base for any of said present search and for use in future searches;

wherein said learning database is automatically generated and further comprises search context data, metadata, past retrieval performance metrics, and adaptive optimization parameters, wherein said intelligent search agent utilizes said learning database to iteratively refine tokenization strategies, vector embeddings, and retrieval ranking criteria to enhance the accuracy and efficiency of future searches.

7. The method of claim 6, wherein said alternative token optimization method is determined by an automated iterative search that is biased towards finding the smallest number of tokens that produces higher significant similarities over a plurality of said searches, thereby defining preferred token optimization method data;

wherein said learning database further comprises token optimization method information, and further storing said preferred token optimization method data in said learning database.

8. The method of claim 7, wherein said alternative token optimization method further comprises at least one token optimization method that uses a combination of adaptive top-k algorithms and automatic relevance thresholding to determine said preferred token optimization method data.

9. The method of claim 2, wherein said machine readable source of said raw data items comprises internet data sources and websites, said index of available raw (unvectorized) data items comprises a web-based search engine, further using at least one web scraper to automatically obtain at least some said raw data items from said internet data sources and websites.

10. The method of claim 1, wherein said plurality of different RAG databases and said multimodal Retrieval Augmented Generation (RAG) encoding system is used to encode and store data types comprising any of text data, image data, video data, and audio data; and wherein said at least one generative AI system is automatically chosen according any of at least some of said data types or according to at least some of a data type language, data type producer, or data type subject matter.

11. The method of claim 1, wherein said at least one generative AI system comprises at least one type of Large Language Model type system.

12. The method of claim 1, wherein said at least one generative AI system comprises at least one type of Large Language Model type system, at least one alternative generative AI system configured to directly process any of image, video, and audio data.

13. The method of claim 1, further automatically formatting said response information for any of dashboards, reports, presentations, and process workflows.

14. The method of claim 1, wherein said at least one user is a plurality of users, each said user has associated access information, and wherein said intelligent search agent uses said associated access information to determine which of said plurality of RAG databases and/or which of said response information is available to said user.

15. The method of claim 1, wherein at least some of said plurality of RAG database further comprise information pertaining to an original version at least some of said data items prior to vectorization and LLM inference, said information comprising any of source file location information, time obtained information, thus enabling at least some of said vector indexed data items to be traced back to their original sources.

16. A method of using an intelligent search agent to search a knowledge base comprising a plurality of data items indexed according to a multimodal Retrieval Augmented Generation (RAG) encoding system, said method comprising:

using an intelligent search agent comprising at least one processor and at least one generative AI system to accept search input from at least one user, interpret said search input, tokenize and vectorize at least some of said interpreted search input, thus producing at least one vectorized query for a present search;

using said intelligent search agent and said at least one vectorized query to search at least some of said knowledge base, and determine at least some data items with indexes that show significant similarity with said at least one vectorized query, thereby producing retrieved data items;

wherein said knowledge base comprises a plurality of different RAG databases, each different RAG database comprising a plurality of data items, each data item indexed by a vector generated by at least one of said at least one Generative AI systems acting upon a tokenized version of that respective data item (vector indexed data item);

wherein said intelligent search agent uses at least some of said retrieved data items, and said search input, to return at least some information from said knowledge base as response information; and wherein, for at least some of said at least one users, said intelligent search agent further uses any of said search inputs, interpreted search input, tokenized search input, said at least one vectorized queries, and said response information to create a learning database for use in any of said present search and for use in subsequent searches;

wherein said intelligent search agent is configured to use an index of available raw (unvectorized) data items and a machine-readable source of said raw data items to increase said RAG databases by performing at least one of automatically extending those RAG databases with additional related vector indexed data items, and automatically producing additional RAG databases with additional unrelated vector indexed data items for any of said present search and for use in future searches; and said intelligent search agent is configured to use said learning database to determine which of said plurality of different RAG databases produce retrieved data items with any of a lower or higher significant similarity over a plurality of said searches, and to produce at least one reformatted RAG database depending on said determination.

17. The method of claim 16, wherein said index of available raw (unvectorized) data items is further categorized according to least one data application type;

wherein said search input further comprises at least one search application type; and when said search application type correlates with said data application type, then using said intelligent search agent to preferentially choose any of those available raw (unvectorized) data items, those machine-readable source of raw data items, and said RAG databases that match said search application type to select or increase said RAG databases for any of said present search and for use in future searches.

18. A method of using an intelligent search agent to search a knowledge base comprising a plurality of data items indexed according to a multimodal Retrieval Augmented Generation (RAG) encoding system, said method comprising:

using an intelligent search agent comprising at least one processor and at least one generative AI system to accept search input from at least one user, interpret said search input, tokenize and vectorize at least some of said interpreted search input, thus producing at least one vectorized query for a present search;

using said intelligent search agent and said at least one vectorized query to search at least some of said knowledge base, and determine at least some data items with indexes that show significant similarity with said at least one vectorized query, thereby producing retrieved data items;

wherein said knowledge base comprises a plurality of different RAG databases, each different RAG database comprising a plurality of data items, each data item indexed by a vector generated by at least one of said at least one Generative AI systems acting upon a tokenized version of that respective data item (vector indexed data item);

wherein said intelligent search agent uses at least some of said retrieved data items, and said search input, to return at least some information from said knowledge base as response information; and wherein, for at least some of said at least one users, said intelligent search agent further uses any of said search inputs, interpreted search input, tokenized search input, said at least one vectorized queries, and said response information to create a learning database for use in any of said present search and for use in subsequent searches;

wherein said intelligent search agent is configured to use an index of available raw (unvectorized) data items and a machine readable source of said raw data items to increase said RAG databases by performing at least one of automatically extending those RAG databases with additional related vector indexed data items, and automatically producing additional RAG databases with additional unrelated vector indexed data items for said at least one user for any of said present search and for use in future searches;

wherein said intelligent search agent is configured to use said learning database to determine which of said plurality of different RAG databases produce retrieved data items with lower significant similarity over a plurality of said searches, thereby determining at least one suboptimal RAG database; and use any of an alternative generative AI system, and an alternative token optimization method, to use data items from said at least one suboptimal RAG database to produce at least one reformatted RAG database;

and automatically determining, using said plurality of said searches, if said reformatted RAG database would have produced a higher significant similarity over said plurality of said searches, thereby testing said at least one reformatted RAG database;

and if said tested at least one reformatted RAG database is superior to said suboptimal RAG database, then adding said at least one tested reformatted RAG database to said knowledge base for any of said present search and for use in future searches.

19. The method of claim 18, wherein said alternative token optimization method is determined by an automated iterative search that is biased towards finding the smallest number of tokens that produces higher significant similarities over a plurality of said searches, thereby defining preferred token optimization method data;

wherein said learning database further comprises token optimization method information, and further storing said preferred token optimization method data in said learning database.

20. The method of claim 19, wherein said alternative token optimization method further comprises at least one token optimization method that uses a combination of adaptive top-k algorithms and automatic relevance thresholding to determine said preferred token optimization method data.

* * * * *